United States Patent [19]

Broden et al.

[11] 4,419,796
[45] Dec. 13, 1983

[54] METHOD OF MAKING SPIN STABILIZED DISCARDING SABOT PROJECTILE

[75] Inventors: David E. Broden, Minnetonka; Wilford E. Martwick, New Hope, both of Minn.

[73] Assignee: Honeywell Inc., Minneapolis, Minn.

[21] Appl. No.: 305,078

[22] Filed: Sep. 24, 1981

[51] Int. Cl.³ .............................................. B21K 21/06
[52] U.S. Cl. ..................................................... 29/1.23
[58] Field of Search ........................ 29/1.2, 1.21, 1.22, 29/1.23, 1.3; 102/519, 520, 523

[56] References Cited

U.S. PATENT DOCUMENTS

| 2,983,224 | 5/1961 | Prosen et al. | 29/1.23 |
| 2,983,225 | 5/1961 | Walker | 102/523 |
| 3,019,733 | 2/1962 | Braid | 29/1.2 |
| 3,036,360 | 5/1962 | Lyon | 29/1.21 |
| 3,069,748 | 12/1962 | Nosler | 29/1.23 |
| 3,551,972 | 1/1971 | Engel | 29/1.23 |
| 3,613,584 | 10/1971 | Hendricks | 102/520 |
| 3,837,057 | 9/1974 | Engel | 29/1.2 |
| 3,905,299 | 9/1975 | Feldman | 102/523 |
| 4,296,687 | 10/1981 | Garrett | 102/523 |

Primary Examiner—James M. Meister
Assistant Examiner—Paul M. Heyrana, Sr.
Attorney, Agent, or Firm—Roger W. Jensen

[57] ABSTRACT

A method of manufacturing a spin stabilized discarding sabot projectile comprising the steps of preassembling a subcalibre cylindrical projectile in a full calibre cylindrical pusher, installing the subassembly in a two section injection molding machine with spring biased pusher locator and spring biased projectile nose locator for precisely holding the subassembly aligned with a primary axis, following which plastic material is injection molded about the projectile. Surplus plastic material may be removed as by machining and a noise piece may be added.

18 Claims, 10 Drawing Figures

SABOT AFTER MACHINING OPERATION

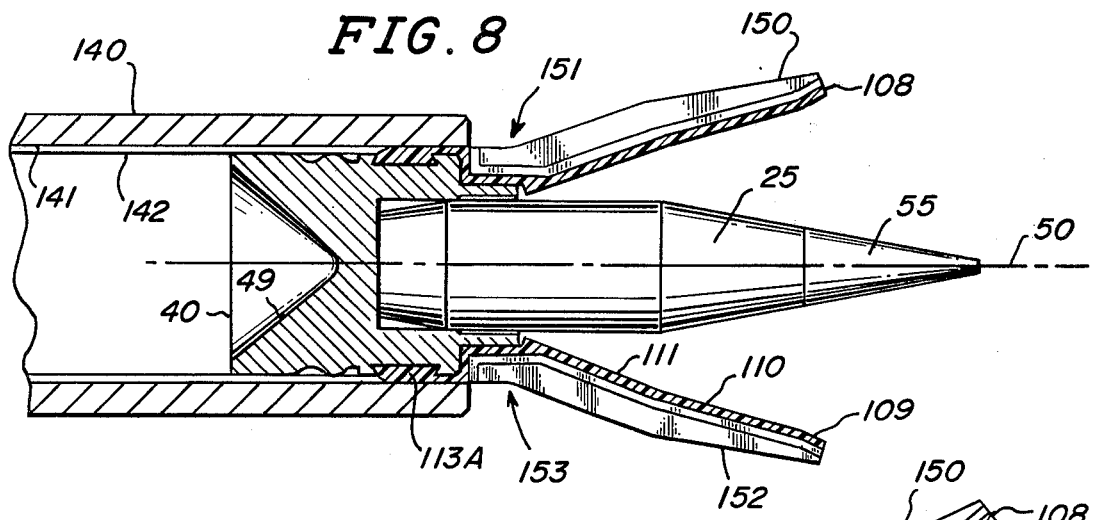
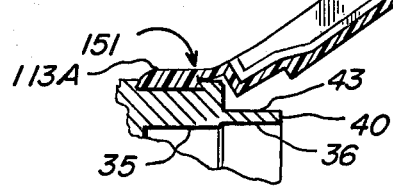
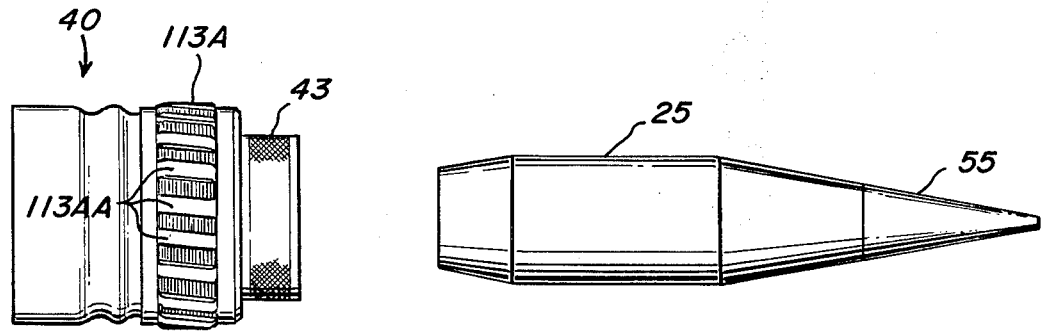
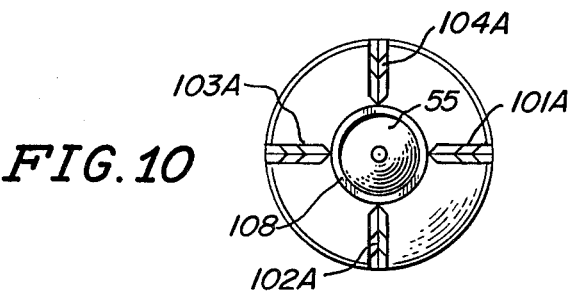

METHOD OF MAKING SPIN STABILIZED DISCARDING SABOT PROJECTILE

BACKGROUND OF THE INVENTION

Spin stabilized discarding sabot projectiles are well known in the field of ordnance. By definition a discarding sabot projectile comprises in part a subcalibre core or projectile coacting with a full calibre pusher. The full calibre pusher coacts with a rifled barrel of a gun firing the projectile; the expanding gases caused by the detonation of a charge imparting a relatively high velocity and spin to the assembled pusher and subcalibre core. After discharge from the muzzle of the gun the sabot is discarded and the subcalibre core/projectile separates from the pusher and continues along its ballistic path, the subcalibre core having a much higher impact velocity (at least theoretically) than would be the case for a full calibre round.

Substantial efforts have been devoted in the past to improve the hitting accuracy of the subcalibre projectile. Hitting accuracy is adversely affected by nonaxial dispersing forces and moments affecting the subcalibre projectile during the critical separation from the pusher and during the separation of the discarding sabot components. All known prior arrangements for producing a discarding sabot projectile have one or more disadvantages, i.e., fail to yield a projectile with a low dispersion factor that can be made on low cost mass production basis.

An object of the present invention is to provide a new and significantly improved method for producing a low dispersion spin stabilized discarding sabot projectile.

This application also discloses a unique spin stabilized discarding sabot projectile which is the subject matter of our copending application filed concurrently herewith.

SUMMARY OF THE INVENTION

Our invention provides a method of producing a low dispersion discarding sabot projectile comprising the steps of:

(a) preassembling a subcalibre cylindrical projectile and a full calibre cylindrical pusher so that a rear portion of said subcalibre projectile is concentrically set into a cup-like central forward facing recess in said pusher, said pusher comprising in part a circumferential rotation groove positioned in approximate radial register with said rear portion of said projectile;

(b) placing said preassembled concentric subcalibre projectile and pusher into a two-section injection molding machine with a first section of said molding machine including recessed means for receiving and positioning the rear portion of said pusher and with a second section of said molding machine having means for receiving and positioning a forward tip portion of said subcalibre projectile;

(c) positioning said two-section molding machine so that said first and second sections are in abutting relationship and define a complex cylindrical cavity concentric with respect to a primary axis passing through (i) the center of said tip portion of said projectile and (ii) the center axis of said pusher;

(d) injection of plastic material into said cavity which material, upon hardening, forms a discarding sabot adjacent said projectile and a rotation ring positioned in said circumferential groove;

(e) removing, as by machining, surplus hardened plastic material from the external surfaces of said discarding sabot and said rotating ring, said machining being done with respect to a said primary axis; and (f) installing a preformed nose piece on said pointed forward tip portion of said subcalibre projectile.

BRIEF DESCRIPTION OF THE DRAWINGS

FIG. 8 is the depiction of the projectile at the point where the projectile is exiting the muzzle of the gun;

FIG. 8A shows an alternate breaking away of the discarding sabot from the projectile;

FIG. 9 is a depiction of the subcalibre projectile with its nose piece after separation from the pusher; and FIG. 10 is a front view of the projectile depicted in FIG. 7 as viewed along section lines 10—10 of FIG. 7.

DESCRIPTION OF THE PREFERRED EMBODIMENT

Figure 1:
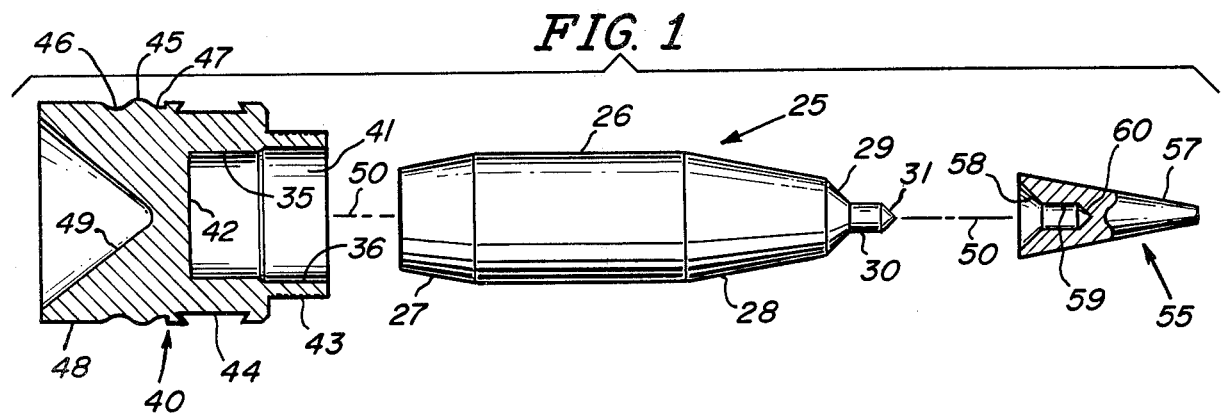
FIG. 1 is an exploded view of a full calibre pusher, a subcalibre projectile or core, and a preformed nose piece for the projectile.

Referring to FIG. 1, reference numeral 25 generally designates a subcalibre projectile shown to be a complex cylindrical form with a main body portion 26, a tapered rear portion 27 (sometimes referred to as a boat tail shape), a tapered forward portion 28 and a pointed forward tip portion comprising a shoulder portion 29, a straight portion 30, and a final pointed tip 31. A suitable material for projectile 25 is tungsten.

Reference numeral 40 generally designates a pusher also having a complex cylindrical shape. Pusher 40 is preferably made out of a strong, lightweight metal such as aluminum. A cup-like centrally located stepped diameter forward facing recess 41 has an end wall 42 and has an aft diameter 35 selected to receive the tapered end portion 27 as well as a small part of the full body section 26 of the subcalibre projectile 25. The forward portion of recess 41 is identified by reference numeral 35; this portion of the recess has a slightly larger diameter than the rear portion 35. (Shown only in FIG. 1). As indicated above, the step between portions 35 and 36 is longitudinally selected so that when the subcalibre projectile 25 is fitted into the pusher (as in FIG. 2) a small longitudinal portion of the portion 26 of projectile 25 sits into the smaller diameter portion 35. The diameters 35 and 26 are selected so that a close fit is provided. This arrangement accurately locates the subcalibre projectile coaxially with the pusher 40. Typical dimensions for diameters 35, 36 and 26 are 0.710+0.001; 0.713+0.001;

and 0.707−0.002 inches respectively. A typical insertion of diameter 26 into the reduced diameter portion 35 of recess 41 is in the range of 0.041 to 0.111 inches. The larger diameter portion 36 provides clearance to allow air to vent into the rear portion of recess 41 behind the subcalibre projectile 25 during separation; this additional clearance is also advantageous because it permits limited angular movement between the pusher and subcalibre projectile during separation without causing binding or perturbation of the flight of the subcalibre projectile. Various means not shown but known to those skilled in the art may be utilized for imparting rotation from the pusher as it accelerates down the gun barrel to the subcalibre projectile 25. The external surface of pusher 40 is a complex cylindrical one comprising separate surfaces identifed in FIG. 1 by reference numerals 43–48. Surface 43 is adjacent the forward end of pusher 40 and is of a relatively small diameter compared to the remainder of pusher 40. Next aft is a rotation ring channel 44. Next aft is an undulating portion identified by reference numerals 45, 46, and 47 to provide a means for attachment of the pusher/projectile to a metallic shell casing not shown. Next aft is a straight portion 48 which extends from the aft or rear part of the pusher forward to the undulating section 46. A conically shaped recess 49 is provided in the rear face or end surface of the pusher 40; this conically shaped surface has great utility with respect to the accurate positioning of the pusher within the injection molding machine to be described below. Further, it permits the saving of some weight in the overall weight of the pusher to thus provide increased velocity for the overall projectile.

Also depicted in FIG. 1 is a preformed nose piece 55 having a tip 57 and a recessed portion identified by reference numerals 58, 59, and 60 which are respectively intended to mate with surfaces 29, 30 and 31 on the tip of projectile 25. Nose piece 55 may be preformed out of a suitable polymer material.

In FIG. 1 reference numeral 50 designates an axis passing through the center of the tip portion of the projectile, (and thus the center axis of the projectile), the center axis of the pusher 40, and the center axis of the nose piece 55.

Figure 2:
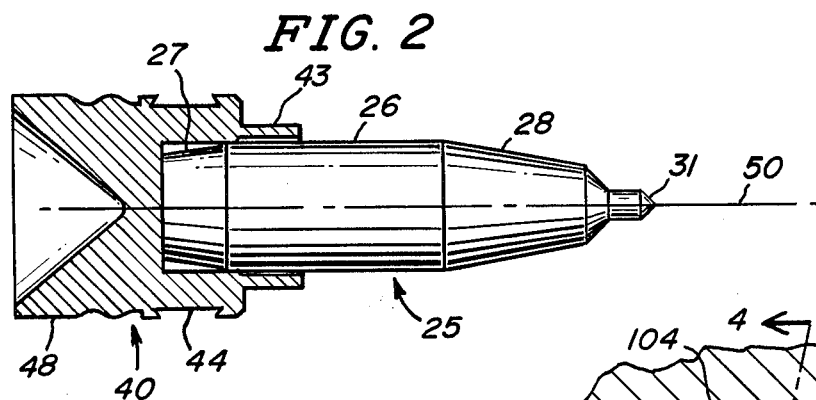
FIG. 2 depicts the pusher and projectile positioned together in a subassembly.

In FIG. 2 the subcalibre projectile 25 and pusher 40 are shown in preassembled form. Here it will be noted that the entire boat tail or rear tapered portion 27 of the subcalibre projectile is within the recess 41 together with a portion of the right cylindrical main body portion 26. As indicated above, the coaction between the reduced diameter portion 35 of recess 41 and portion 26 tends to provide a self-alignment between the axes of pusher 40 and subcalibre projectile 25.

Figure 3:
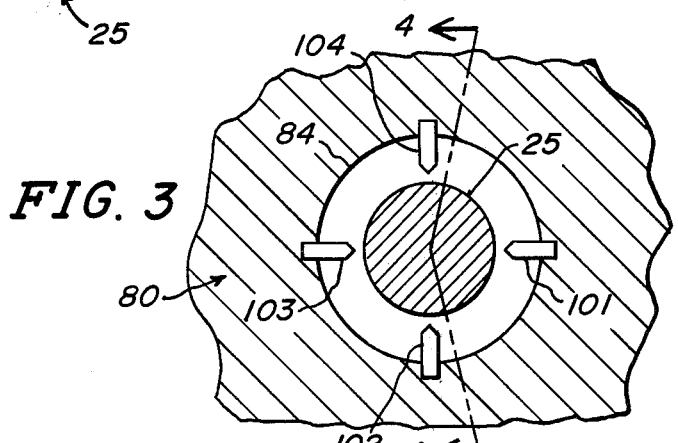
FIG. 3 is a cross-sectional view of the subcalibre projectile positioned within an injection molding machine as viewed along section lines 3—3 of FIG. 4.
Figure 4:
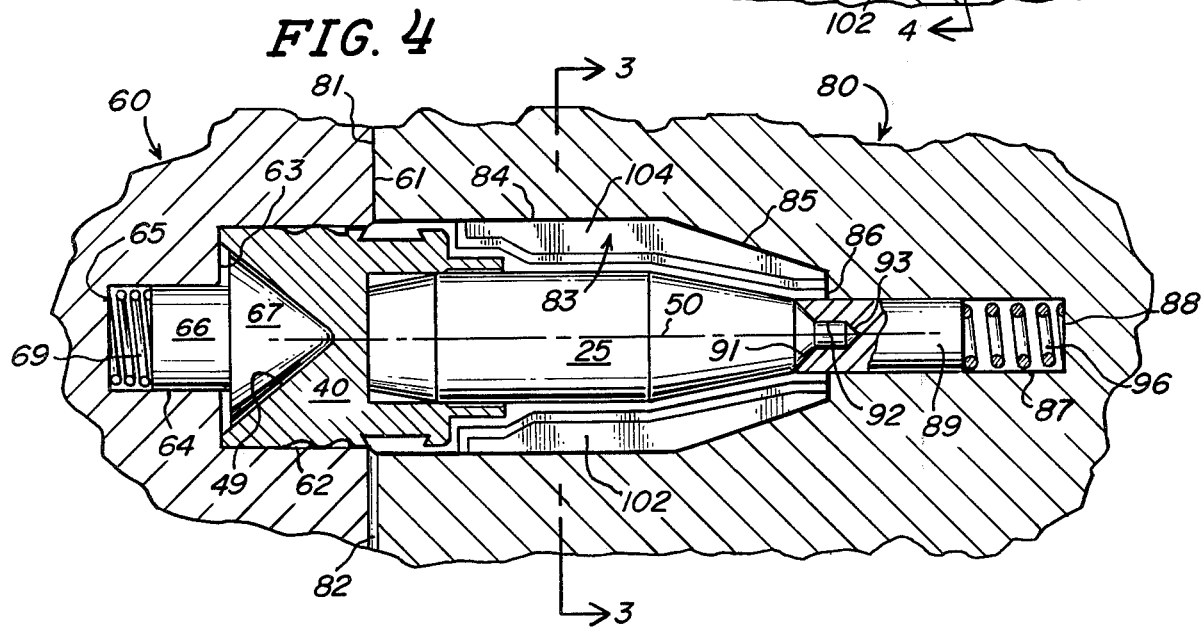
FIG. 4 is a longitudinal cross-sectional view of the discarding sabot molding machine as viewed along section lines 4—4 of FIG. 3.

Referring to FIGS. 3 and 4 the injection molding apparatus is depicted; it may be described as a two-section molding machine having a first section 60 with an end face 61 and a second section 80 with an end face 81, the apparatus as depicted in FIG. 4 being shown with the two sections in abutting relationship, i.e., with surfaces 61 and 81 abutting one another.

The first section 60 comprises a recess 62 adapted to receive the full rear half of the pusher 40. At the bottom of the recess 62 is an end surface 63 which in turn has a central bore 64 or recess in which is positioned the shaft portion 66 of an axially displaceable pusher locator 67 having a relatively large diameter convex end face more specifically identified as a conically shaped face extending forward into the recess 62 and adapted to mate with the conically shaped or concave recess 49 in the pusher 40. A spring 69 is positioned between the end of shaft portion 66 and the end 65 of bore 64 so as to spring bias the locator 67 to the right as depicted in FIG. 4.

An appropriate port means 82 are provided between the section 60 and 80 so as to provide a gate for injection of plastic material. The second section of the injection molding machine has a substantial cavity 83 by comprising a first portion 84 extending from surface 81 in a direction generally parallel to the primary axis 50 to a point in radial register with the junction between surfaces 26 and 28 on the subcalibre projectile 25; at this point the shape of the mold is beveled at an angle to axis 50 represented by reference numeral 85 and terminating in a section 86 which is perpendicular to the primary axis 50. Means are provided in the second section 80 for receiving and positioning the forward tip portion of the subcalibre projectile; more specifically these means include a spring biased axially displaceable plunger member 89 which is adapted to move axially along primary axis 50 within a recess 87. An appropriate spring means 96 is provided between one end of the member 89 and the end surface 88 of the recess 87, the spring means 96 tending to displace the member 89 to the left as shown in FIG. 4. At the other end of the receiving end of the positioning means is a complex recess having surfaces 91, 92, and 93 adapted to mate with respectively the surfaces 29, 30 and 31 of the subcalibre projectile. Due to the substantial axial extent of the portion 30 on the subcalibre projectile and its coacting cooperating surface 92 in the positioning and receiving means it will be understood that the forward tip of the subcalibre projectile is held in alignment with the primary axis 50. Because the rear portion of section 26 of the projectile 25 is closely held by portion 35 of pusher 40, the entire projectile 25 is in alignment with the primary axis 50.

Figure 5:
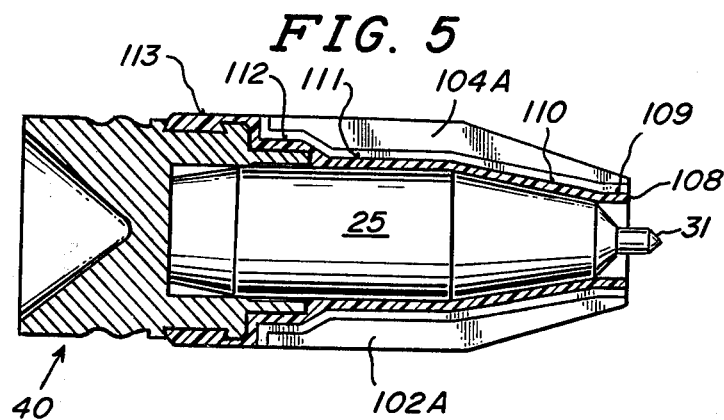
FIG. 5 is a cross-sectional longitudinal cross-sectional view of the preassembled pusher and subcalibre projectile together with the discarding sabot, the foregoing being depicted in the form upon removal from the unique injection molding machine.

A plurality of knife edge means 101, 102, 103, and 104 shown best in FIG. 3 extend from member 80 toward the subcalibre projectile and have the function of providing weakened slots in the final discardable sabot, in this regard see slots 102A and 104A in FIG. 5.

It is thus seen that the preassembled pusher and subcalibre projectile are held within the injection molding machine by the pusher plug locator 67 and the subcalibre projectile nose locator 89. In this manner, as described above, the extremely critical result of having the axes of the subcalibre projectile and the pusher in alignment with the primary axis 50 is accomplished. This in combination with the utilization of the primary axis for purposes of molding the discarding sabot and the machining of the discarding sabot will assure an an extremely low dispersion rate, i.e., high firing accuracy for the projectile. A suitable polymer may be used for the injection molding of the discardable sabot.

FIG. 5 depicts the projectile upon removal from the molding machine. A number of reference numerals have been allocated to various portions of the injection molded discarding sabot. At the forward end of the projectile the reference numeral 108 designates the forward face of the plastic, this would correspond to mating with the surface 86 in the mold. Slightly aft of surface 108 is a straight portion 109 with a cylindrical inside diameter, the outer contour being the bottoms of the weakened slots. Portion 109 continues to the junction between surfaces 28 and 29 on the subcalibre projectile 25. Further aft is a portion 110 lying adjacent to surface 28; further aft is a straight portion 111 lying adjacent to surface 26. Reference numeral 112 designates that portion of the discarding sabot that surrounds portion 43 of the pusher 40. Further reference numeral 114 designates the portion of the molded material which has been molded into the rotation ring groove 44 as shown in FIGS. 1 and 2.

Figure 6:
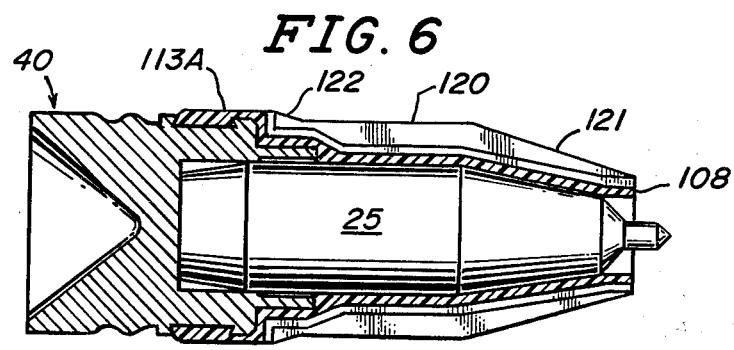
FIG. 6 is a longitudinal cross-sectional view of the discarding sabot projectile after the final machining operation.

The next step in the manufacture of the projectile is to machine away surplus material leaving a configuration as depicted in FIG. 6. In FIG. 6 the reference numeral 113A designates the final diameter of the rotation ring and reference numerals 120, 121 and 122 depict the mid, forward, and rear external surfaces of the discarding sabot. The cost of the projectile may be reduced through the elimination of this machining step if the mold cavity is characterized so as to accommodate the varying amount of shrinkage of the plastic material caused by the variations in thickness of the plastic material such that the final shape and size after shrinkage will meet the design criteria.

Figure 7:
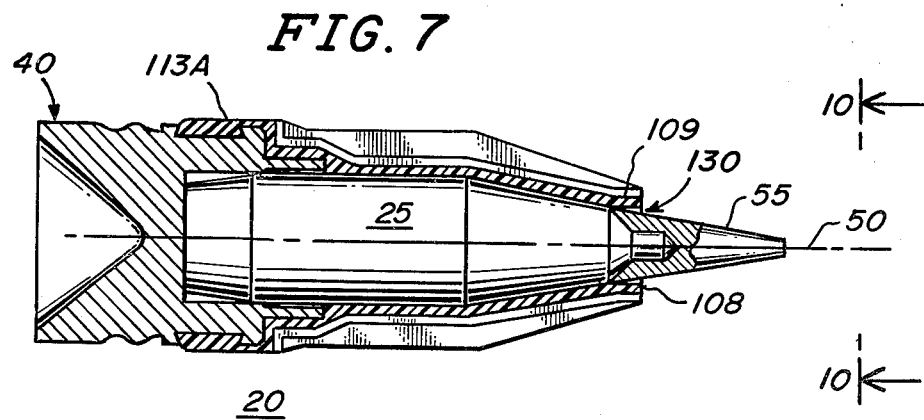
FIG. 7 is a longitudinal cross-sectional view of the projectile after installation of the nose piece.

FIG. 7 shows the projectile in the form of FIG. 6 together with the nose piece 55 which has been added and bonded to the projectile with appropriate bonding means. The reference numeral 130 depicts a gap between the external surface of the nose piece 55 and the portion 109 of the discarding sabot. This gap has significance in assisting the breaking away of the sabot from the projectile as the projectile exits from the gun barrel. In this regard refer to FIG. 8 wherein the projectile is shown emerging from the gun barrel 140. Parenthetically it will be noted that the principal internal diameter of the gun barrel is identified by reference numeral 142; this corresponds with the diameter 48 on the pusher 40. The rifling rings have a larger diameter 141 and it will be noted that the rotation ring 113A is adapted to be the same as the diameter 141. When the sabot portion of the projectile exits the end or muzzle of the gun the polymer sabot fractures along the grooves 101A–104A and the sabot pieces are discarded by the effects of the projectile spin. The pusher is pulled rearward (relatively away from the subcalibre core 25 because of aerodynamic, i.e., drag, forces. In FIG. 8 the sabot has begun the separation process beginning with the nose of the projectile. In FIG. 8 the reference numerals 109, 110, and 111 are depicted and may be compared with the corresponding numbers as shown in FIG. 5. The two principal elements of the sabot depicted in FIG. 8 are identified by reference numerals 150 and 152 respectively breaking away from the pusher at locations identified by reference numerals 151 and 153. Alternately, (as shown in FIG. 8A) the separation of the sabot elements may be adjacent the ring portion 43 of pusher 40 with the fracture line being approximately at the forward end of the rotation ring 113A; in this regard see FIG. 9.

FIG. 9 shows the subcalibre projectile 25 with its associated nose piece 55 fully separated from the pusher 40 and on its way toward its target. The pusher 40 is depicted to include the rotation ring 113A traversed by a plurality of rifling rings 113AA.

While we have described a preferred embodiment of our invention, it will be understood that the invention is limited only by the scope of the following claims.

I claim:

1. The method of producing a low dispersion discarding sabot projectile comprising the steps of:
    (a) preassembling a subcalibre cylindrical projectile and a full calibre cylindrical pusher so that a tapered rear portion of said subcalibre projectile is set into a cup-like central forward facing recess in said pusher, said pusher comprising in part a circumferential groove positioned in approximate radial register with said tapered rear portion of said projectile;
    (b) placing said preassembled subcalibre projectile and pusher into a two-section injection molding machine with a first section of said molding machine including recessed means for receiving and positioning the rear portion of said pusher and with a second section of said molding machine having spring biased recessed means for receiving and positioning a pointed forward tip portion of said subcalibre projectile;
    (c) positioning said two-section molding machine so that said first and second sections (i) are in abutting relationship, and (ii) define a discarding sabot cavity concentrically about said subcalibre projectile and a rotation ring cavity concentrically about said circumferential groove;
    (d) injection of plastic material into said cavities which material, upon hardening, forms a discarding sabot and a rotation ring;
    (e) removing, as by machining, surplus hardened plastic material from the external surfaces of said discarding sabot and said rotating ring, said machining being done with respect to a reference axis passing through said pointed forward tip portion of said subcalibre projectile and the center of said pusher; and
    (f) installing a preformed nose piece on said pointed forward tip portion of said subcalibre projectile.

2. The method of producing a low dispersion discarding sabot projectile comprising the steps of:
    (a) preassembling a subcalibre cylindrical projectile and a full calibre cylindrical pusher so that a tapered rear portion of said subcalibre projectile is set into a cup-like central forward facing recess in said pusher;
    (b) placing said preassembled subcalibre projectile and pusher into a two-section injection molding machine with a first section of said molding machine including recessed means for receiving and positioning said pusher and with a second section of said molding machine having spring biased recessed means for receiving and positioning a pointed forward tip portion of said subcalibre projectile;
    (c) positioning said two-section molding machine so that said first and second sections (i) are in abutting relationship, and (ii) define a discarding sabot cavity concentrically about said subcalibre projectile; and
    (d) injection of plastic material into said cavity which material, upon hardening, forms a discarding sabot.

3. The method of claim 2 further characterized by the discarding sabot, after hardening, being machined to final external dimensions with respect to a reference axis passing through (i) the center of said pointed tip portion of said projectile and (ii) the center axis of said pusher.

4. The method of producing a low dispersion discarding sabot projectile comprising the steps of:
    (a) preassembling a subcalibre cylindrical projectile and a full calibre cylindrical pusher so that a rear portion of said subcalibre projectile is concentrically set into a cup-like central forward facing recess in said pusher, said pusher comprising in part a circumferential groove positioned in approximate radial register with said rear portion of said projectile;

(b) placing said preassembled concentric subcalibre projectile and pusher into a two-section injection molding machine with a first section of said molding machine including recessed means for receiving and positioning the rear portion of said pusher and with a second section of said molding machine having means for receiving and positioning a forward tip portion of said subcalibre projectile;

(c) positioning said two-section molding machine so that said first and second sections are in abutting relationship and define a complex cylindrical cavity concentric with respect to a primary axis passing through (i) the center of said tip portion of said projectile and (ii) the center axis of said pusher;

(d) injection of plastic material into said cavity which material, upon hardening, forms a discarding sabot adjacent said projectile and a rotation ring positioned in said circumferential groove;

(e) removing, as by machining, surplus hardened plastic material from the external surfaces of said discarding sabot and said rotating ring, said machining being done with respect to a said primary axis; and (f) installing a preformed nose piece on said pointed forward tip portion of said subcalibre projectile.

5. The method of claim 4 further characterized by the receiving and positioning means of said second section of said molding machine comprising a spring biased axially displaceable plunger having a recess in one end thereof adapted to receive said forward tip portion of said subcalibre projectile.

6. The method of claim 5 further characterized by said plunger recess being adapted to coact with said forward tip portion so as to provide alignment of the axis of said projectile with said primary axis.

7. The method of claim 4 further characterized by said recessed means of said first section of said molding machine including a centrally positioned pusher locator having an end face shaped to fit a recess in the rear end face of said pusher.

8. The method of claim 5 further characterized by said recessed means of said first section of said molding machine including a centrally positioned spring biased axially displaceable pusher locator having a convex end face shaped to fit a concave recess in the rear end face of said pusher.

9. The method of claim 8 further characterized by said convex end face and concave recess being matched and conically shaped.

10. The method of claim 9 further characterized by said spring means associated with said second section being stronger than said spring means associated with said first section whereby, when said first and second sections are in abutting relationship, said preassembled projectile and pusher are displaced axially along the primary axis toward said first section whereat the rear portion of said pusher is within and abutted against said recessed means thereof and the axis of said pusher is aligned with said primary axis through coaction between said pusher location and said conically shaped recess in the rear end face of said pusher.

11. The method of producing a low dispersion discarding sabot projectile comprising the steps of:
(a) preassembling a subcalibre cylindrical projectile and a full calibre cylindrical pusher so that a rear portion of said subcalibre projectile is concentrically set into a cup-like central forward facing recess in said pusher;

(b) placing said preassembled concentric subcalibre projectile and pusher into a two-section injection molding machine with a first section of said molding machine including means for receiving and positioning said pusher and with a second section of said molding machine having means for receiving and positioning a forward tip portion of said subcalibre projectile;

(c) positioning said two-section molding machine so that said first and second sections are in abutting relationship and define a complex cylindrical cavity concentric with respect to a primary axis passing through (i) the center of said tip portion of said projectile and (ii) the center axis of said pusher; and (d) injection of plastic material into said cavity which material, upon hardening, forms a discarding sabot surrounding at least a substantial portion of said projectile.

12. The method of producing a low dispersion discarding sabot projectile comprising the steps of:
(a) preassembling a subcalibre cylindrical projectile and a full calibre cylindrical pusher so that a rear portion of said subcalibre projectile is concentrically set into a cup-like central forward facing recess in said pusher;

(b) placing said preassembled concentric subcalibre projectile and pusher into a two-section injection molding machine with a first section of said molding machine including means for receiving and positioning said pusher and with a second section of said molding machine having means for receiving and positioning a forward tip portion of said subcalibre projectile;

(c) positioning said two-section molding machine so that said first and second sections are in abutting relationship and define a complex cylindrical cavity concentric with respect to a primary axis passing through (i) the center of said tip portion of said projectile and (ii) the center axis of said pusher;

(d) injection of plastic material into said cavity which material, upon hardening, forms a discarding sabot around said projectile except for said tip portion thereof; and (e) installing a preformed nose piece on said forward tip portion of said subcalibre projectile.

13. The method of claim 12 further characterized by the receiving and positioning means of said second section of said molding machine comprising a spring biased axially displaceable plunger having a recess in one end thereof adapted to receive said forward tip portion of said subcalibre projectile.

14. The method of claim 13 further characterized by said plunger recess being adapted to coact with said forward tip portion so as to provide alignment of the axis of said projectile with said primary axis.

15. The method of claim 13 further characterized by said receiving and positioning means of said first section of said molding machine including a spring biased axially displaceable pusher locator having a convex end face shaped to fit a concave recess in the rear end face of said pusher.

16. The method of claim 1 further characterized by the receiving and positioning means of said second section of said molding machine comprising a spring biased axially displaceable plunger having a recess in one end thereof adapted to receive said forward tip portion of said subcalibre projectile.

17. The method of claim 16 further characterized by said plunger recess being adapted to coact with said forward tip portion so as to provide alignment of the axis of said projectile with said primary axis.

18. The method of claim 16 further characterized by said receiving and positioning means of said first section of said molding machine including a spring biased axially displaceable pusher locator having a convex end face shaped to fit a concave recess in the rear end face of said pusher.

* * * * *

UNITED STATES PATENT AND TRADEMARK OFFICE
CERTIFICATE OF CORRECTION

PATENT NO. : 4,419,796

DATED : December 13, 1983

INVENTOR(S) : David E. Broden et al.

It is certified that error appears in the above-identified patent and that said Letters Patent is hereby corrected as shown below:

On the title page, item /75/ insert -- John B. Warren, Wayzata, Minn. --.

Signed and Sealed this

Thirteenth Day of March 1984

[SEAL]

Attest:

GERALD J. MOSSINGHOFF

Attesting Officer     Commissioner of Patents and Trademarks